Patented Mar. 26, 1940

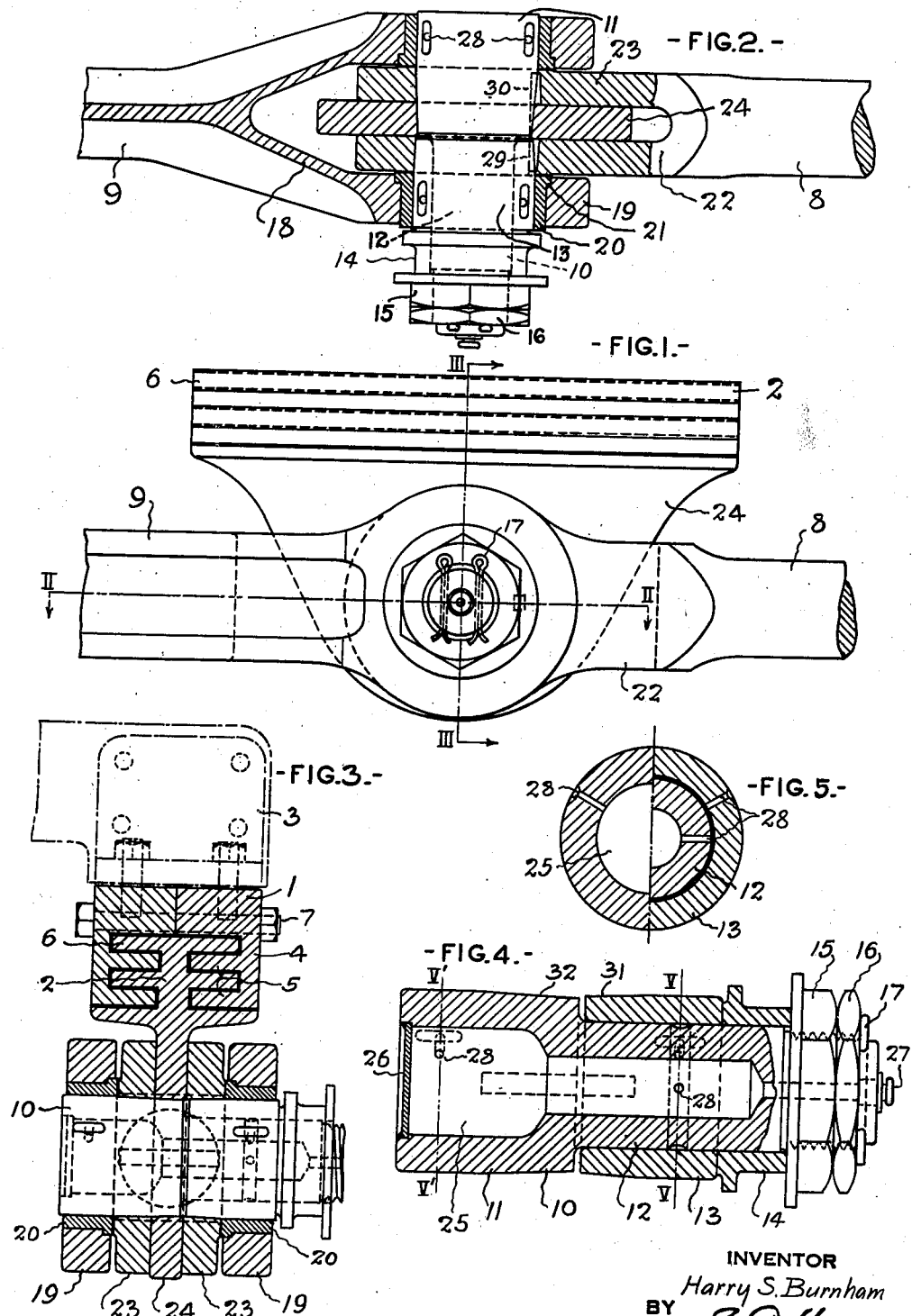

2,195,376

UNITED STATES PATENT OFFICE 2,195,376

LOCOMOTIVE CROSSHEAD STRUCTURE

Harry S. Burnham, Schenectady, N. Y., assignor to American Locomotive Company, New York, N. Y., a corporation of New York Application May 28, 1938, Serial No. 210,791

7 Claims. (Cl. 308—3)

This invention relates to locomotive crosshead structures, and has for an object to simplify and lighten such structures.

Other objects of and advantages achieved by this invention will be apparent from the following description thereof and the claims appended hereto.

In present day heavy locomotives it is of prime importance that all parts be made as light as possible in order to keep down the weight of the locomotive within permissible limits. It is of particular importance in the case of crosshead structures as these represent reciprocating weights, and for this reason, according to good practice, these structures should be made as light as possible consistent with endurance and maintenance.

The invention is illustrated in the accompanying drawing wherein Figure 1 is a side elevation of a locomotive crosshead structure embodying the present invention, the crosshead guide not being shown and the piston and main rods being shown fragmentally; Fig. 2 is a sectional view on the line II—II of Fig. 1, parts being shown in plan; Fig. 3 is a sectional view on the line III—III of Fig. 1, parts being shown in elevation, the guide being shown in section and the guide bracket being shown in dot and dash lines; Fig. 4 is an enlarged longitudinal central sectional view of the wrist pin and its associated parts, parts being shown in elevation; and Fig. 5, at the right is a section on the line V—V, and at the left a section on the line V'—V' of Fig. 4.

The structure comprises a guide, and a crosshead having a part slidably engaging the guide. The invention is not restricted as to these features. In the present instance as to these features a well-known type of structure is shown for illustrative purposes. It comprises a guide 1 and a shoe or crosshead part 2. The guide is bolted to a bracket 3 which in practice extends from the side of the locomotive frame. The guide is formed of sides 4 having their inner faces spaced from each other and being provided with a plurality of ways 5. The shoe or crosshead part 2 fits within the space between the sides 4 and is provided with flanges 6 which slidably engage the ways 5. The wearing faces of the shoe are faced with lining metal, and the guide is made in halves bolted together by the bolts 7.

The piston rod 8 and the main connecting rod 9, at their adjacent ends, are each forked, the branches of the forks being orificed for the reception of the wrist pin, this forked piston rod being a feature of the present invention.

In the preferred embodiment, the fork branches of the piston rod are disposed between the fork branches of the main rod, the fork branches of the main rod being permitted rotative movement and the fork branches of the piston rod being fixedly secured against rotative movement relative to the wrist pin. Nevertheless other arrangements may be followed, if desired, which are contemplated as within the scope of the claims appended hereto.

The wrist pin 10 has an enlarged end portion 11 and a reduced adjacent end portion 12. A sleeve 13 is slidably mounted on the reduced end portion, as is also a collar 14 which provides a bearing for the combination link of the valve gear (not shown). The outer end of the reduced portion 12 is threaded and a nut 15 is screwed thereon bearing against the collar 14. A lock nut 16 and split pins 17 are employed, the latter to hold the nuts 15 and 16 in place.

The main rod 9 is provided with a fork 18. The branches 19 of this fork are orificed and bushings 20 having inner flanges 21 are forced in these orifices from the inner sides of the branches, the flanges seating in shoulders formed in the orifices for preventing outward movement of the bushing. The branches 19 are mounted, one upon the enlarged end portion 11 of the wrist pin 10 and the other upon the sleeve 13 at their outer end portions, for rotative movement relative thereto, and these portions are preferably cylindrical as are also the inner faces of the bushings 20 to permit free rotative relative movement.

The piston rod 8 is provided with a fork 22. The branches 23 of this fork are orificed for mounting them, one upon the wrist pin 10 and the other upon the sleeve 13 between the branches 19.

The wrist pin is connected to the shoe or crosshead part 2 by a single plate only. This plate extends from the part 2 and is indicated by the reference numeral 24. It forms another feature of the present invention. This plate forms a part of the crosshead and is preferably formed integral with the part 2. The plate is orificed for mounting it upon the wrist pin where it is disposed between the branches 23. The sleeve 13 may be extended to include the orifice of the plate 24 but preferably it is foreshortened as shown and the orifice of the plate is mounted on an adjacent part of the wrist pin.

The wrist pin is hollowed to provide a grease chamber 25, closed by a plate 26. The chamber is supplied with grease or other lubricant through a fitting 27 at the opposite end of the pin between a pair of split pins 17. The fitting is shown as of the Alemite type, which is usually employed for grease lubricant. The chamber 25 has lubricant emitting passageways 28 that serve to lubricate the inner faces of the bushings 20 and the faces adjacent thereto.

The sleeve 13 is keyed to prevent rotative movement relative to the piston rod. This is accomplished, in the present instance, by providing a key 29 locking the sleeve to the branch 23 adjacent thereto against rotative movement, while permitting sliding movement of the sleeve, relative to the piston rod during assemblage. A similar key 30 locks the wrist pin 10 to the other branch 23 against rotative movement, while permitting sliding movement of the pin, relative to the piston rod during assemblage. The piston rod, wrist pin and sleeve therefore have no relative rotative movement, but are permitted sliding relative movement for adjustment.

The slots in the branches 23 for the keys 29 and 30 are in alignment and slanting at their bases to prevent outward movement of the keys. The key slot in the wrist pin extends through the portion thereof that is in engagement with the plate to facilitate assemblage. To assemble the rods, pin and sleeve, the keys are first placed in the branches 23; the rods and plate are then assembled with their respective orifices in alignment; the sleeve is then inserted in the orifices (with its key slot in alignment with its key) from the end of the aligned orifices at the side of the plate adjacent the sleeve; and the wrist pin is inserted in the orifices and sleeve (with its key slot in alignment with its key) from the opposite end of the aligned orifices. The pin may be inserted before the sleeve is inserted, if desired.

In the preferred embodiment it will be noted that the forked ends of the rods are formed as integral parts of the rods. With such a form of piston rod the construction at the end of the power cylinder adjacent the piston rod is specially devised to make possible the employment of the integrally formed forked end of the piston rod, or the arrangement may be assembled by applying the piston last at the front end of the power cylinder.

The portion of the sleeve upon which the branch 23 is mounted is provided with a frusto-conical face 31 and the orifice in the adjacent branch 23 is correspondingly shaped. The portion of the wrist pin upon which the other branch 23 is mounted is provided with a similar frusto-conical face 32 which is preferably, but not necessarily, continued to include the plate 24, and the orifices in the adjacent branch 23 and plate 24 are correspondingly shaped. These frusto-conical faces converge toward each other and serve as abutting faces for the corresponding respective faces of the orifices in the branches.

By advancing the nut 15, the collar 14 and sleeve 13 will be moved toward the plate 24 and the wrist pin will be moved in an opposite direction thereby producing a wedge fit between the frusto-conical faces and the adjacent faces of the orifices in the branches 23. This not only will serve to prevent the branches 23 from spreading and the wrist pin from possible longitudinal displacement but will further operate to force the branches 23 in pressure engagement with the plate 24. Also the conical fit tends to transmit the power from the piston rod to the wrist pin without working or pounding of the parts. The wrist pin 10 and sleeve 13 are thus rigidly fixed in place with the end portions thereof providing journals for the bearing bushings 20. The main rod 9 is held against lateral movement by the piston rod.

The plate 24 may be slightly resilient to yield or bend, which, together with the tolerances between the working parts, will compensate for any bending stress introduced by angular vibration of the main pin of the locomotive. Furthermore this arrangement provides for a self-alignment of the crosshead with the guide before the wrist pin is drawn solidly home.

While the invention has been shown in connection with a guide of the single bar "multiple bearing" type disposed above the wrist pin it may also be employed with a guide of the double bar type or with other suitable conventional types.

While there has been hereinbefore described an approved embodiment of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. A locomotive crosshead structure comprising a wrist pin; a forked piston rod; a forked main rod, the branches of said forks being carried by said wrist pin with the piston rod fork branches disposed between the main rod fork branches; a guide; and a crosshead having a part slidably engaging said guide and connected to said wrist pin by a single plate only, forming another part of said crosshead and disposed between said piston rod fork branches, said wrist pin including a body portion, tubular means slidably mounted on said body portion opposite the branches at one side of said plate, said main rod being mounted, one branch thereof upon said body portion and the other branch thereof upon said tubular means for rotative movement relative to said wrist pin, said tubular means having a face abutting a face of the piston rod fork branch opposite thereto, and said body portion having a face abutting a face of the other branch of said piston rod fork, said abutting faces being directed toward each other, whereby when said tubular means is moved in a direction toward said plate and said body portion is moved in an opposite direction, said piston rod fork branches will be forced into pressure engagement with said plate, and means for imparting said movements and maintaining said pressure engagement.

2. A locomotive crosshead structure comprising a wrist pin; a forked piston rod; a forked main rod, the branches of said forks being carried by said wrist pin with the piston rod fork branches disposed between the main rod fork branches; a guide; and a crosshead having a part slidably engaging said guide and connected to said wrist pin by a single plate only, forming another part of said crosshead and disposed between said piston rod fork branches, said wrist pin including a body portion, tubular means slidably mounted on said body portion opposite the branches at the one side of said plate, said main rod being mounted, one branch thereof upon said body portion and the other branch thereof upon said tubular means for rotative movement relative to said wrist pin, said tubular means having a frusto-conical exterior face engaging a corresponding face of the piston rod fork branch opposite thereto, and said body portion having a frusto-conical exterior face engaging a corresponding face of the other branch of said piston rod fork, said engaging faces converging toward each other, whereby when said tubular means is moved in a direction toward said plate and said body portion is moved in an opposite direction, said piston rod fork branches will be forced into pressure engagement with said plate, and means threaded on said body portion for imparting said movements and maintaining said pressure engagement.

3. A locomotive crosshead structure comprising a guide; a crosshead having a part slidably engaging said guide and a plate extending from said part and provided with a transverse opening; a main rod having a horizontal fork at an end thereof; a piston rod having a horizontal fork at an end thereof, each of the branches forming the forks of said ends being in planes parallel to each other and to said plate and having a transverse opening, one of the branches of each forked end being positioned at one side of said plate and the other branch of each forked end being positioned at the opposite side of said plate; and a horizontal wrist pin extending through said openings in said branches and said plate in operative engagement therewith.

4. A locomotive crosshead structure comprising a guide; a crosshead having a part slidably engaging said guide and a plate extending from said part and provided with an opening; a main rod; a piston rod, each of said rods having a forked end, each of the branches forming the forks of said ends having an opening, the branches of the fork of said piston rod being positioned one at each side of and adjacent to said plate for angular adjustment of said piston rod relative to said plate, and the branches of the fork of said main rod being positioned one at each of the outer sides of said piston rod branches; and a wrist pin extending through said openings in said branches and said plate, supporting said main rod to permit rotative movement of said main rod thereabout and bearing against one of said piston rod fork branches, said wrist pin having a stem, a sleeve mounted on said stem bearing against the other of said piston rod fork branches, and means forcing said sleeve toward said plate and said stem in the opposite direction, whereby said piston rod fork branches are retained in adjusted frictional pressure engagement with said plate.

5. A locomotive crosshead structure comprising a guide; a crosshead having a part supported by said guide for sliding movement relative thereto, and a plate extending vertically from said part with its plane disposed in the direction of said movement; a piston rod having a horizontal forked end; a main rod having a horizontal forked end, the branches of said forks being of plate formation and each lying in a separate plane parallel to said plate plane, said plate and said branches each having a solid part provided within its periphery with a transverse orifice, said orifies being in alignment, one branch of each of said forks being disposed at one side of said plate and the other branch of each of said forks being disposed at the other side of said plate; and a wrist pin extending through said plate orifice in supported engagement with the wall thereof for entire support by said plate in said plane thereof, and extending through said branch orifices in supporting engagement with the walls thereof, whereby said plate will support each of said forks through said wrist pin.

6. A locomotive crosshead structure comprising a guide; a crosshead having a part supported by said guide for sliding movement relative thereto, and a plate extending vertically from said part with its plane disposed in the direction of said movement; a piston rod having a horizontal forked end; a main rod having a horizontal forked end, the branches of said forks being of plate formation and each lying in a separate plane parallel to said plate plane, side by side, the branches of each fork being in unsupporting relation with the branches of the other fork, said plate and said branches each having a solid part provided within its periphery with a transverse orifice, said orifices being in alignment, one branch of each of said forks being disposed at one side of said plate and the other branch of each of said forks being disposed at the other side of said plate; and a wrist pin extending through said plate orifice in supported engagement with the wall thereof for entire support by said plate in said plane thereof, and extending through said branch orifices in supporting engagement with the walls thereof, whereby said plate will support each of said forks through said wrist pin.

7. A locomotive crosshead structure comprising a guide; a crosshead having a part supported by said guide for sliding movement relative thereto, and a plate extending vertically from said part with its plane disposed in the direction of said movement; a piston rod having a horizontal forked end; a main rod having a horizontal forked end, the branches of said forks being of plate formation and each lying in a separate plane parallel to said plate plane, said plate and said branches each having a solid part provided within its periphery with a transverse orifice, said orifices being in alignment; a wrist pin extending through said plate orifice in supported engagement with the wall thereof for entire support by said plate in said plane thereof, and extending through said branch orifices in supporting engagement with the walls thereof, said plate being disposed between said piston rod fork branches and in releasable pressure engagement therewith, permitting angular adjustment therebetween in a plane parallel to said plate plane, and said piston rod fork branches being disposed between said main rod fork branches, said forks being entirely free from supporting engagement of one with the other; and releasable means including said pin for producing said pressure engagement.

HARRY S. BURNHAM.